United States Patent
Wood, Jr.

(10) Patent No.: US 6,289,209 B1
(45) Date of Patent: *Sep. 11, 2001

(54) WIRELESS COMMUNICATION SYSTEM, RADIO FREQUENCY COMMUNICATIONS SYSTEM, WIRELESS COMMUNICATIONS METHOD, RADIO FREQUENCY COMMUNICATIONS METHOD

(75) Inventor: Clifton W. Wood, Jr., Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/907,689

(22) Filed: Aug. 8, 1997

Related U.S. Application Data

(63) Continuation-in-part of application No. 08/772,173, filed on Dec. 18, 1996, now Pat. No. 5,842,118.

(51) Int. Cl.⁷ .................................................. H04B 1/38
(52) U.S. Cl. ........................................................ 455/277.1
(58) Field of Search .......................... 455/41, 59, 62, 455/67.1, 73, 575, 101, 103, 106, 133, 272, 277.1, 277.2; 340/825.54; 342/42, 43, 44, 50, 51; 375/267, 299

(56) References Cited

U.S. PATENT DOCUMENTS

| | | | |
|---|---|---|---|
| 4,075,632 | 2/1978 | Baldwin et al. | 343/6.8 |
| 4,584,709 | 4/1986 | Kneisel et al. | 455/78 |
| 4,742,567 | 5/1988 | Ohe et al. | 455/277 |
| 4,926,182 | 5/1990 | Ohta et al. | 342/44 |
| 5,097,484 | 3/1992 | Akaiwa | 375/40 |
| 5,203,018 | 4/1993 | Hirose | 455/101 |
| 5,203,024 | 4/1993 | Yamao | 455/133 |
| 5,432,027 | 7/1995 | Tuttle et al. . | |
| 5,491,723 | 2/1996 | Diepstraten | 455/101 |
| 5,494,495 | 2/1996 | Tuttle . | |
| 5,497,140 | 3/1996 | Tuttle . | |
| 5,499,397 | 3/1996 | Wadin et al. | 455/277.1 |
| 5,507,035 | 4/1996 | Bantz et al. | 455/101 |
| 5,539,775 | 7/1996 | Tuttle et al. . | |
| 5,568,512 | 10/1996 | Rotzoll . | |
| 5,583,850 | 12/1996 | Snodgrass et al. | 370/342 |
| 5,613,219 | * 3/1997 | Vogel et al. | 455/101 |
| 5,621,412 | 4/1997 | Sharpe et al. | 342/51 |
| 5,649,296 | 7/1997 | MacLellan et al. | 455/38.2 |
| 5,662,718 | 9/1997 | Tuttle . | |
| 5,842,118 | * 11/1998 | Wood, Jr. | 455/101 |

FOREIGN PATENT DOCUMENTS

| | | |
|---|---|---|
| 0 474 491 | 9/1991 | (EP) . |
| 0 670 558 | 2/1995 | (EP) . |
| 0 740 262 | 4/1996 | (EP) . |
| WO 95/30290 | 11/1995 | (WO) . |
| WO 98/27670 | 6/1998 | (WO) . |

* cited by examiner

*Primary Examiner*—Thanh Cong Le
(74) *Attorney, Agent, or Firm*—Wells, St. John, Roberts Gregory & Matkin, P.S.

(57) ABSTRACT

A wireless communications system comprising a first transponder adapted to be coupled to one of a plurality of selectable antennas, having a look-up table including locations holding data representing antennas, and having pointers pointing to selected ones of the locations, the pointers defining an order in which antennas will be used to attempt communication; and a second transponder configured to communicate with the first transponder, wherein the first transponder uses an antenna defined by data in one location of the table for communication with the second transponder, and, if successful communication with the second transponder is not established, the first transponder uses an antenna defined by data in another location of the table selected in accordance with the order defamed by the pointers.

12 Claims, 8 Drawing Sheets

| | 90 |
|---|---|
| ATTEMPT 1 | X1 | R1 |
| ATTEMPT 2 | X1 | R2 |
| ATTEMPT 3 | X2 | R1 |
| ATTEMPT 4 | X2 | R2 |

Fig. 8

| 90 | |
|---|---|
| X2 | R1 |
| X1 | R1 |
| X1 | R2 |
| X2 | R2 |

Fig. 9

| 90 | |
|---|---|
| X1 | R1 |
| X2 | R1 |
| X1 | R2 |
| X2 | R2 |

Fig. 10

WIRELESS COMMUNICATION SYSTEM, RADIO FREQUENCY COMMUNICATIONS SYSTEM, WIRELESS COMMUNICATIONS METHOD, RADIO FREQUENCY COMMUNICATIONS METHOD

CROSS-REFERENCE TO RELATED APPLICATION

This is a continuation-in-part of U.S. patent application Ser. No. 08/772,173, filed Dec. 18, 1996, U.S. Pat. No. 5,842,118.

TECHNICAL FIELD

This invention relates to radio frequency communication devices.

BACKGROUND OF THE INVENTION

Radio frequency (wireless) communications systems are known in the art. Radio frequency communications systems typically include a transmitter and a receiver, such as for radio or television broadcasting. Other communications systems are bidirectional and include a first transponder that can send or receive a radio frequency communication, and a second transponder that can receive the radio frequency communications from the first transponder and transmit, via radio frequency, back to the first transponder. For example, cellular telephone communications are bidirectional.

Some communication systems include antenna diversity systems. For example, U.S. Pat. No. 5,203,024 to Yamao (incorporated herein by reference) discloses an antenna selection diversity receiver system for TDM signals that switches antennas for every assigned time slot so the best receive signal quality is obtained, according to a prediction made by using signal quality just before the assigned time slot.

U.S. Pat. No. 5,499,397 to Wadin et al. (incorporated by reference) discloses selecting one of at least two antennas in a communication unit. A signal is received by a radio frequency receiver during a receiving period from one of the antennas. The signal is transmitted in a digital communications format. The quality of the receive signal is determined by a switch diversity algorithm that bases the decision to switch antennas on predetermined thresholds established for each of: a received signal strength indicator, a phase error signal, and a recovered clock signal.

U.S. Pat. No. 4,584,709 to Kneisel et al. (incorporated by reference) discloses an antenna system that evaluates the quality of a received signal, and if the signal is below a predetermined threshold level, an alternate antenna will be selected. The antenna system will continue to sample the available antennas until an antenna produces a signal of acceptable quality.

U.S. Pat. No. 4,742,567 to Ohe, et al. (incorporated by reference) discloses an automobile antenna system including two antennas attached to the rear windshield of a vehicle body. A high-frequency pickup is provided on the front pillar of the vehicle body for detecting the lowering of the output level of a main antenna in advance, and an antenna selecting signal generator actuates a switch circuit so that the main antenna, the output level of which is predicted to dip after a predetermined lapse of time, is changed over to the sub antenna.

U.S. Pat. No. 5,097,484 to Akaiwa discloses transmission and reception equipment which is in digital communication with transmission and reception equipment having a single antenna An antenna for transmission is selected from a plurality of antennae at the time of transmission in accordance with information of a memory unit.

Radio frequency identification devices define another form of bidirectional communications systems. As large numbers of objects are moved in inventory, product manufacturing, and merchandising operations, there is a continuous challenge to accurately monitor the location and flow of objects. Additionally, there is a continuing goal to interrogate the location of objects in an inexpensive and streamlined manner. Furthermore, there is a need for tag devices suitably configured to mount to a variety of objects including goods, items, persons, or animals, or substantially any moving or stationary and animate or inanimate object. One way of tracking objects is with an electronic identification system.

One presently available electronic identification system utilizes a magnetic field modulation system to monitor tag devices. An interrogator creates a magnetic field that becomes detuned when the tag device is passed through the magnetic field. In some cases, the tag device may be provided with a unique identification code in order to distinguish between a number of different tags. Typically, the tag devices are entirely passive (have no power supply), which results in a small and portable package. However, this identification system is only capable of distinguishing a limited number of tag devices, over a relatively short range, limited by the size of a magnetic field used to supply power to the tags and to communicate with the tags.

Another electronic identification system utilizes an RF transponder device affixed to an object to be monitored, in which an interrogator transmits an interrogation signal to the device. The device receives the signal, then generates and transmits a responsive signal. The interrogation signal and the responsive signal are typically radio-frequency (RF) signals produced by an RF transmitter circuit. Since RF signals can be transmitted over greater distances than magnetic fields, RF-based transponder devices tend to be more suitable for applications requiring tracking of a tagged device that may not be in close proximity to an interrogator. For example, RF-based transponder devices tend to be more suitable for inventory control or tracking.

BRIEF DESCRIPTION OF THE DRAWINGS

Preferred embodiments of the invention are described below with reference to the following accompanying drawings.

FIG. 8 illustrates a stack or queue containing data representing an order of antennas to use in attempts to communicate from the interrogator to the transponder of FIG. 2 or 3.

FIG. 9 illustrates the stack after being rearranged in accordance with one embodiment of the invention.

FIG. 10 illustrates the stack after being rearranged in accordance with another embodiment of the invention.

SUMMARY OF THE INVENTION

The invention provides a wireless communications system comprising a first transponder adapted to be coupled to one of a plurality of selectable antennas, having a look-up table including locations holding data representing antennas, and having pointers pointing to the locations. The pointers define an order in which antennas will be used to attempt communication. The communications system further includes a second transponder configured to communicate with the first transponder. The first transponder uses an antenna defined by data in one location of the look-up table for communication with the second transponder. If successful communication with the second transponder is not established, the transponder uses an antenna defined by data in another location of the look-up table.

In one aspect of the invention, the first transponder communicates with the second transponder using backscatter communication. More particularly, in this embodiment, the first transponder employs separate receive and transmit antennas, and wherein the respective locations of the look-up table store data representing antenna pairs including one transmit antenna and one receive antenna.

One aspect of the invention provides a wireless communications system wherein the second transponder comprises an integrated circuit including a transmitter, a receiver, and a microprocessor. In one aspect of the invention, the second transponder comprises a radio frequency identification device including memory storing data identifying the second transponder.

In an alternative embodiment of the invention, a queue or stack is provided including locations holding data representing antennas. The queue or stack defines an order in which antennas will be used to attempt communication. If successful communication with the second transponder is not established, the transponder uses an antenna defined by data in another location of the queue or stack.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
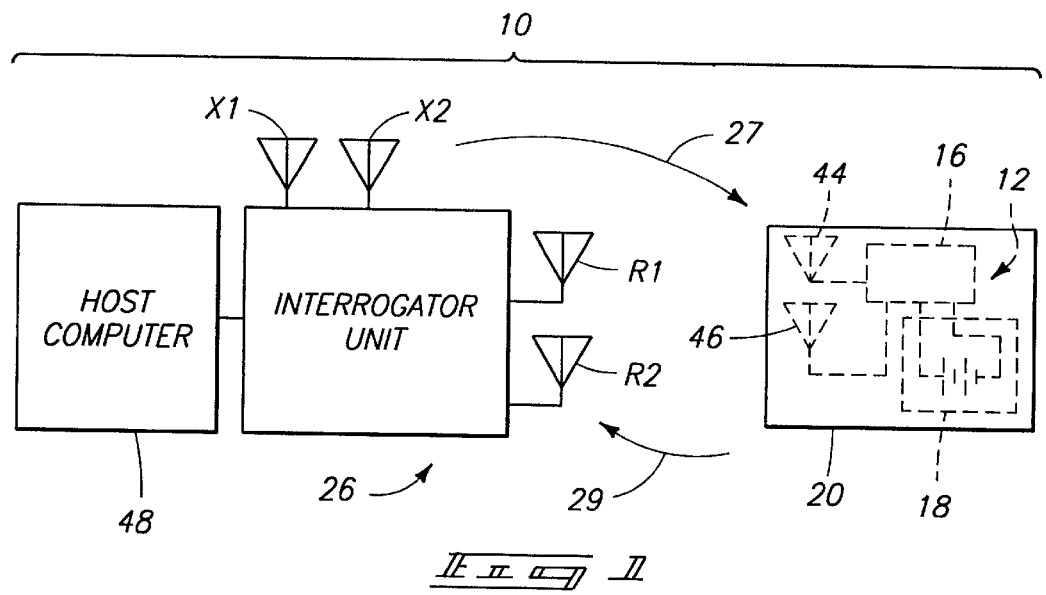
FIG. 1 is a block diagram illustrating a communication system embodying the invention.

FIG. 1 illustrates a wireless communications system 10 embodying the invention. The communications system 10 includes a first transponder including an interrogator unit (interrogator) 26 and a host computer 48 in communication with the interrogator 26. The communications system 10 further includes a radio frequency data communication device 12 such as the device disclosed in commonly assigned U.S. Patent application Ser. No. 08/705,043, filed Aug. 29, 1996, and incorporated herein by reference. While other embodiments are possible, in the illustrated embodiment, the radio frequency data communications device 12 includes a transponder 16 having a receiver 30 and a transmitter 32. The data communications device 12 further includes a power source 18 connected to the transponder 16 to supply power to the transponder 16. The data communications device 12 further includes at least one antenna connected to the transponder 16 for wireless transmission and reception. In the illustrated embodiment, the data communications device 12 includes at least one antenna 46 connected to the transponder 16 for radio frequency transmission by the transponder 16, and at least one receive antenna 44 connected to the transponder 16 for radio frequency reception by the transponder 16. In one embodiment, the device 12 includes a single antenna for transmitting and receiving. In the illustrated embodiment, the transponder 16 is in the form of an integrated circuit. However, in alternative embodiments, some or all of the circuitry of the transponder 16 is not necessarily all included in a single integrated circuit.

The power source 18 is a thin film battery in the illustrated embodiment; however, in alternative embodiments, other forms of power sources can be employed.

The radio frequency data communication device 12 can be included in any appropriate housing or packaging.

Figure 2:
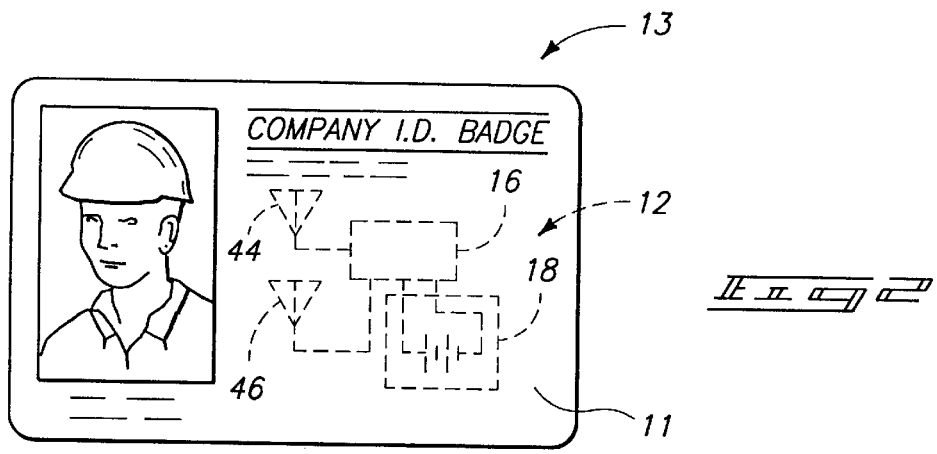
FIG. 2 is a front view of an employee badge according to one embodiment the invention.

FIG. 2 shows but one example of a housing in the form of a card 11 comprising plastic or other suitable material. The plastic card 11 houses the radio frequency data communication device 12 to define an employee identification badge 13 including the radio frequency data communication device 12. In one embodiment, the front face of the badge 13 has visual identification features including an employee photograph as well as identifying text.

Figure 3:
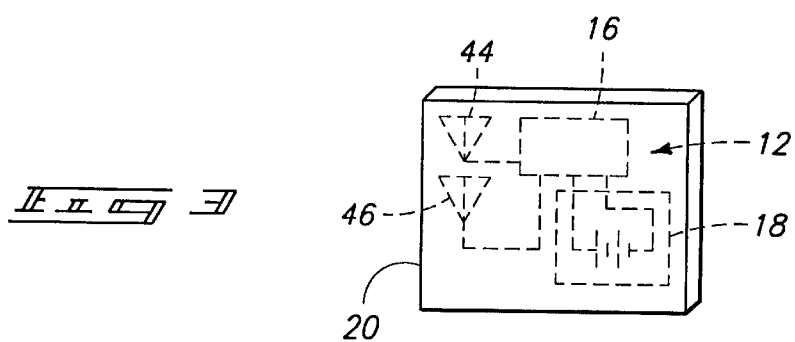
FIG. 3 is a front view of a radio frequency identification tag according to another embodiment of the invention.

FIG. 3 illustrates but one alternative housing supporting the device 12. More particularly, FIG. 3 illustrates a miniature housing 20 encasing the device 12 to defame a tag which can be supported by an object (e.g., hung from an object, affixed to an object, etc.).

Although two particular types of housings have been disclosed, the device 12 can be included in any appropriate housing. The device 12 is of a small size that lends itself to applications employing small housings, such as cards, miniature tags, etc. Larger housings can also be employed. The device 12, housed in any appropriate housing, can be supported from or attached to an object in any desired manner. The housing can be sewn on to an object, hung from an object, implanted in an object (hidden), etc.

Various configurations are possible for the antenna connected to the transponder 16. In one embodiment, separate antennas 44 and 46 are provided for receiver and transmitter. In another embodiment (FIG. 1), a single antenna is shared by the receiver and transmitter. In one embodiment, one or more antennas are defined by conductive epoxy screened onto a card or housing. In the illustrated embodiment, the antenna is conductively bonded to the integrated circuit via bonding pads.

If the power source 18 is a battery, the battery can take any suitable form. Preferably, the battery type will be selected depending on weight, size, and life requirements for a particular application. In one embodiment, the battery 18 is a thin profile button-type cell forming a small, thin energy cell more commonly utilized in watches and small electronic devices requiring a thin profile. A conventional button-type cell has a pair of electrodes, an anode formed by one face and a cathode formed by an opposite face. In an alternative embodiment, the battery 18 comprises a series connected pair of button type cells. Instead of using a battery, any suitable power source can be employed.

The device 12 transmits and receives radio frequency communications to and from the interrogator 26. The interrogator 26 includes a plurality of antennas, as well as transmitting and receiving circuitry, similar to that implemented in the device 16. The host computer 48 acts as a master in a master-slave relationship with the interrogator 26. The host computer 48 includes an applications program for controlling the interrogator 26 and interpreting responses, and a library of radio frequency identification device applications or functions. Most of the functions communicate with the interrogator 26. These functions effect radio frequency communication between the interrogator 26 and the device 12. These functions are described below in a section titled "Protocol." In one embodiment, the host computer 48 and the interrogator 26 are combined together (e.g., in a common housing), or functions of the host computer are implemented in hard wired digital logic circuitry.

In the illustrated embodiment, the communications system 10 includes multiple selectable transmit antennas Xl, X2, etc., and multiple receive antennas R1, R2, etc. connected to the interrogator 26. In one embodiment, the communications system 10 includes multiple selectable antennas that are respectively used both for transmitting and receiving by the interrogator 26.

Generally, the interrogator 26 transmits an interrogation signal or command 27 ("forward link") via one of the antennas Xl, X2, etc. The device 12 receives the incoming interrogation signal via its antenna 44. Upon receiving the signal 27, the device 12 responds by generating and transmitting a responsive signal or reply 29 ("return link"). The interrogator 26 is described below in greater detail.

In one embodiment, the responsive signal 29 is encoded with information that uniquely identifies, or labels the particular device 12 that is transmitting, so as to identify any object or person with which the device 12 is associated. Other embodiments are possible for the device 12, such as cellular telephone embodiments, or embodiments that include global positioning circuitry (e.g., such as the transponder devices sold by Micron Communications, Inc. under the trademark "AMBIT."

In the embodiment illustrated in FIG. 1, multiple devices 12 can be employed; however, there is no communication between multiple devices 12. Instead, the multiple devices 12 communicate with the interrogator 26.

FIG. 1 illustrates the device 12 as being in the housing 20 of FIG. 3. The system would operate in a similar manner if the device 12 is provided in a housing such as the housing 10 of FIG. 2, or any other appropriate housing. Multiple devices 12 can be used in the same field of an interrogator 26 (i.e., within communications range of an interrogator 26). Similarly, multiple interrogators 26 can be in proximity to one or more of the devices 12.

The system 10 is advantageous over prior art devices that utilize magnetic field effect systems because, with the system 10, a greater range can be achieved, and more information can be obtained (instead of just an identification number). As a result, such a system 10 can be used, for many applications. The system 10 is useful whenever transmission over a large range is desirable, such as for inventory control. In one embodiment, the sensitivity of the devices 12 is adjustable so that only devices within a certain range of the interrogator 26 will respond. In another embodiment, the power of the interrogator 26 is adjustable so that only devices within a certain range of the interrogator 26 will respond.

However, a power conservation problem is posed by implementations where batteries are used to supply power to the integrated circuit 16. If the integrated circuit 16 operates continuously at full power, battery life will be short, and device 12 will have to be frequently replaced. If the battery 18 is permanently sealed in a housing, replacement of the battery will be difficult or impossible. One reason for sealing the battery with the integrated circuit 16 and antenna 14 in a housing is to simplify the design and construction, to reduce the cost of production, and protect the electrical interconnections between devices. Another reason is protection of the battery and integrated circuit 16 from moisture and contaminants. A third reason is to enhance the cosmetic appeal of the device 12 by eliminating the need for an access port or door otherwise necessary to insert and remove the battery. When the battery is discharged, the entire badge or stamp is then discarded. It is therefore desirable in this and other applications to incorporate power conservation techniques into the integrated circuit 16 in order to extend useful life.

Figure 4:
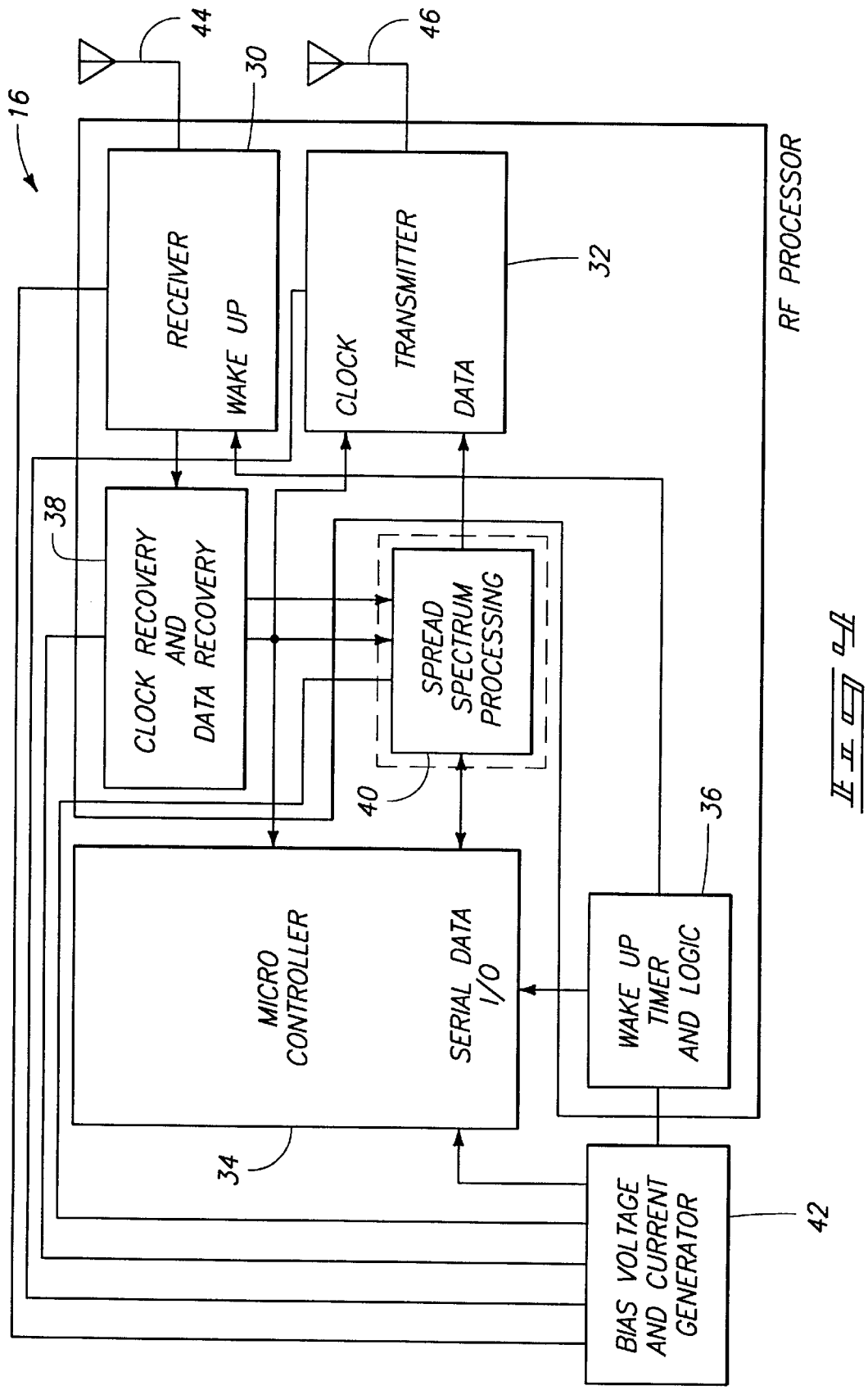
FIG. 4 is a circuit schematic of a transponder included in the system of FIG. 1.

FIG. 4 is a high level circuit schematic of the transponder 16 utilized in the devices of FIGS. 1–3. In the embodiment shown in FIG. 4, the transponder 16 is a monolithic integrated circuit. More particularly, in the illustrated embodiment, the integrated circuit 16 comprises a single die, having a size of 209×116 mils$^2$, including the receiver 30, the transmitter 32, a micro controller or microprocessor 34, a wake up timer and logic circuit 36, a clock recovery and data recovery circuit 38, and a bias voltage and current generator 42.

In one embodiment, the devices 12 switch between a "sleep" mode of operation, and higher power modes to conserve energy and extend battery life during periods of time where no interrogation signal 27 is received by the device 12, using wake up timer and logic circuitry 36.

In one embodiment, a spread spectrum processing circuit 40 is also included in the transponder 16. In this embodiment, signals transmitted and received by the interrogator 26, and transmitted and received by the device 12 are modulated spread spectrum signals. Spread spectrum modulation is described below. In the illustrated embodiment, the modulation scheme for replies sent by the transmitter 32 is selectable. One of the available selections for replies sent by the transmitter 32 is modulated spread spectrum.

Many modulation techniques minimize required transmission bandwidth. However, the spread spectrum modulation technique employed in the illustrated embodiment requires a transmission bandwidth that is up to several orders of magnitude greater than the minimum required signal bandwidth. Although spread spectrum modulation techniques are bandwidth inefficient in single user applications, they are advantageous where there are multiple users, as is the case with the instant radio frequency identification system 24. The spread spectrum modulation technique of the illustrated embodiment is advantageous because the interrogator signal can be distinguished from other signals (e.g., radar, microwave ovens, etc.) operating at the same frequency. The spread spectrum signals transmitted by the device 12 and by the interrogator 26 are pseudo random and have noise-like properties when compared with the digital command or reply. The spreading waveform is controlled by a pseudo-noise or pseudo random number (PN) sequence or code. The PN code is a binary sequence that appears random but can be reproduced in a predetermined manner by the device 12. More particularly, incoming spread spectrum signals are demodulated by the device 12 or by the interrogator 26 through cross correlation with a version of the pseudo random carrier that is generated by the device 12 itself or the interrogator 26 itself, respectfully. Cross correlation with the correct PN sequence unspreads the spread spectrum signal and restores the modulated message in the same narrow band as the original data.

A pseudo-noise or pseudo random sequence (PN sequence) is a binary sequence with an autocorrelation that resembles, over a period, the autocorrelation of a random binary sequence. The autocorrelation of a pseudo-noise sequence also roughly resembles the autocorrelation of band-limited white noise. A pseudo-noise sequence has many characteristics that are similar to those of random binary sequences. For example, a pseudo-noise sequence has a nearly equal number of zeros and ones, very low correlation between shifted versions of the sequence, and very low cross correlation between any two sequences. A pseudo-noise sequence is usually generated using sequential logic circuits. For example, a pseudo-noise sequence can be generated using a feedback shift register.

A feedback shift register comprises consecutive stages of two state memory devices, and feedback logic. Binary sequences are shifted through the shift registers in response to clock pulses, and the output of the various stages are logically combined and fed back as the input to the first stage. The initial contents of the memory stages and the feedback logic circuit determine the successive contents of the memory.

The illustrated embodiment employs direct sequence spread spectrum modulation. A direct sequence spread spectrum (DSSS) system spreads the baseband data by directly multiplying the baseband data pulses with a pseudo-noise sequence that is produced by a pseudo-noise generator. A single pulse or symbol of the PN waveform is called a "chip." Synchronized data symbols, which may be information bits or binary channel code symbols, are added in modulo-2 fashion to the chips before being modulated. The receiver performs demodulation. For example, in one embodiment the data is phase modulated, and the receiver performs coherent or differentially coherent phase-shift keying (PSK) demodulation. In another embodiment, the data is amplitude modulated. Assuming that code synchronization has been achieved at the receiver, the received signal passes through a wideband filter and is multiplied by a local replica of the PN code sequence. This multiplication yields the unspread signal.

A pseudo-noise sequence is usually an odd number of chips long. In the illustrated embodiment, one bit of data is represented by a thirty-one chip sequence. A zero bit of data is represented by inverting the pseudo-noise sequence.

Spread spectrum techniques are known in the art. See, for example, "Spread Spectrum Systems," by R. C. Dixon, published by John Wiley and Sons, Inc.

The interrogator sends out a command that is spread around a certain center frequency (e.g, 2.44 GHz). After the interrogator transmits the command, and is expecting a response, the interrogator switches to a CW mode (continuous wave mode). In the continuous wave mode, the interrogator does not transmit any information. Instead, the interrogator just transmits 2.44 GHz radiation. In other words, the signal transmitted by the interrogator is not modulated. After the device 12 receives the command from the interrogator, the device 12 processes the command. If the device 12 is in a backscatter mode it alternately reflects or does not reflect the signal from the interrogator to send its reply. For example, in the illustrated embodiment, two halves of a dipole antenna are either shorted together or isolated from each other to send a reply.

Frequency hopping is employed in one embodiment. In the illustrated embodiment, frequency hopping does not occur when the interrogator transmits a command, but occurs when the interrogator is in the continuous wave mode. The interrogator, in the continuous wave mode, hops between various frequencies close to the 2.44 GHz frequency. These various frequencies are sufficiently close to the 2.44 GHz frequency that backscatter antenna reflection characteristics of the device 12 are not appreciably altered. Because the interrogator is hopping between frequencies, the interrogator knows what frequency backscatter reflections to expect back from the device 12. By hopping between various frequencies, the amount of time the interrogator continuously uses a single frequency is reduced. This is advantageous in view of FCC regulatory requirements.

In the illustrated embodiment, no attempt is made to frequency hop at the interrogator to a pseudo-random sequence and then correlate to that at the receiver. However, in alternative embodiments, such correlation takes place.

In one embodiment, the transmitter 32 is switchable between operating in a modulated backscatter transmitter mode, and operating in an active mode. The transmitter 32 switches between the backscatter mode and the active mode in response to a radio frequency command, instructing the transmitter to switch, sent by the interrogator 26 and received by the receiver 30. In the active mode, a carrier for the transmitter is extracted from a signal received by the receiver 30.

Active transmitters are known in the art.

In one embodiment, the transmitter 32 is capable of transmitting using different modulation schemes, and the modulation scheme is selectable by the interrogator. More particularly, if it is desired to change the modulation scheme, the interrogator sends an appropriate command via radio frequency. In this embodiment, the transmitter can switch between multiple available modulation schemes such as Binary Phase Shift Keying (BPSK), Direct Sequence Spread Spectrum, On-Off Keying (OOK), and Modulated Backscatter (MBS).

In one embodiment, the clock for the entire integrated circuit 16 is extracted from the incoming message itself by clock recovery and data recovery circuitry 38. This clock is recovered from the incoming message, and used for timing for the micro controller 34 and all the other clock circuitry on the chip, and also for deriving the transmitter carrier or the subcarrier, depending on whether the transmitter is operating in active mode or backscatter mode.

In addition to recovering a clock, the clock recovery and data recovery circuit 38 also performs data recovery on valid incoming signals. The valid spread spectrum incoming signal is passed through the spread spectrum processing circuit 40, and the spread spectrum processing circuit 40 extracts the actual ones and zeros of data from the incoming signal. More particularly, the spread spectrum processing circuit 40 takes the chips from the spread spectrum signal, and reduces each thirty-one chip section down to a bit of one or zero, which is passed to the micro controller 34.

The micro controller 34 includes a serial processor, or I/O facility that received the bits from the spread spectrum processing circuit 40. The micro controller 34 performs further error correction. More particularly, a modified hamming code is employed, where each eight bits of data is accompanied by five check bits used by the micro controller 34 for error correction. The micro controller 34 further includes a memory, and after performing the data correction, the micro controller 34 stores bytes of the data bits in memory. These bytes contain a command sent by the interrogator 26. The micro controller 34 responds to the command.

For example, the interrogator 26 may send a command requesting that any device 12 in the field respond with the device's identification number. Status information is also returned to the interrogator 26 from the device 12 when the device 12 responds.

The transmitted replies have a format similar to the format of incoming messages. More particularly, a reply starts with a preamble (e.g., all zeros in active mode, or alternating double zeros and double ones in backscatter mode), followed by a Barker or start code which is thirteen bits long, followed by actual data.

No stop bits are included in the incoming message or reply, in the preferred embodiment. Instead, part of the incoming message describes how many bytes are included, so the integrated circuit 16 knows how much information is included. Similarly, part of the outgoing reply describes how many bytes are included, so the interrogator 12 knows how much information is included. The incoming message and outgoing reply preferably also include a check sum or redundancy code so that the integrated circuit 16 or the interrogator 12 can confirm receipt of the entire message or reply.

After the reply is sent, the integrated circuit 16 returns to the sleep mode, and the wake up timer and logic circuit 36 starts timing again for the next wake up (e.g., in 16 milliseconds, or whatever period is selected).

The interrogator 26 provides a communication link between a host computer and the transponder 16. The interrogator 26 connects to the host computer 48 via an IEEE-1284 enhanced parallel port (EPP). The interrogator communicates with the transponder 16 via the RF antennas X1, X2, . . . , R1, R2 . . . , etc.

In one embodiment, communications from the interrogator 26 to the transponder 16, and communications from the transponder 16 to the interrogator 26 use different physical protocols.

The physical communications protocol for communications from the interrogator 26 to the transponder 16 is referred to as the "forward link" protocol. The forward link data is sent in the following order:

Preamble

Barker Code

Command Packet

Check Sum

A Maximal Length Pseudo Noise (PN) Sequence is used in the Direct Sequence Spread Spectrum (DSSS) communications scheme in the forward link. In one embodiment, the sequence is generated by a linear feedback shift register .of the form [5.2]. That is, there are five registers, the output of the second register is X-ORed with the output of the fifth register, and the result is fed into the input of the first register one. This produces a repeating 31 "chip" sequence. The sequence ends with all registers set to one. The sequence is taken from the output of the first register. This code is synchronous with the data in that each data bit comprises one and only one full PN sequence. The chip sequence for each bit is:

001 1010 0100 0010 1011 1011 0001 1111.

Other embodiments are, of course, possible. For example, other forms of linear feedback shift registers can be employed.

A zero bit is transmitted as one inverted full cycle of the PN sequence. A one bit is transmitted as one full noninverted cycle of the PN sequence.

In the illustrated embodiment, the data is not differentially encoded.

In one embodiment, there are at least two available "chipping" rates. One rate is 9.5375 Mchips/sec (high band) and another rate is 4.768750 Mchips/sec (low band).

The preamble precedes the data. In one embodiment, the preamble includes a series of zeros, followed by a start or Barker code. In embodiments where the transponder 16 includes wake up timer and logic circuitry 36, the preamble includes a series of zeros for a duration equal to the wakeup interval (e.g., 0.5, 16, 64, or 256 ms) plus 2 milliseconds, followed by a start or Barker code.

In one embodiment, the Barker code is defined by the following bit string: 1111 1001 1010 1. Other embodiments are possible.

Command data is grouped into 13-bit words. Each word includes eight data bits (D7, D6, D5, D4, D3, D2, D1, DO) and five ECC (Error Correction Code) bits (P4, P3, P2, P1, and P0). In one embodiment, the bit transmission order is (with D7 transmitted first): D7, D6, D5, D4, D3, D2, D1, DO, P4, P3, P2, P1, P0 . . .

In one embodiment, the ECC bits (P4-P0) are generated using the following equations:

P0=(D1+D2+D5+D7) modulo 2

P1=[(D1+D3+D4+D6) modulo 2] Complement

P2=(D0+D2+D3+D6+D7) modulo 2

P3=[(D0+D4+D5+D6+D7) modulo 2] Complement

P4 32 (D0+D1+D2+D3+D4+D5) modulo 2.

Data rates depend on which data band is being used. The high data band has an effective data rate (adjusting for PN and ECC) of 189.3 Kbps. The low data band has an effective data rate of 94.68 Kbps.

In the illustrated embodiment, a 16-bit check sum is provided to detect bit errors on the packet level. A transponder 16 can be programmed to either return a reply if a bad check sum is found in the forward link, or to simply halt execution and send no replies. In one embodiment, a 16 bit CRC is employed in the forward link, the return link, or both, instead of or in addition to the check sum.

The physical communications protocol for communications from the transponder 16 to the interrogator 26 is referred to as the "return link" protocol. In the illustrated embodiment, the return link messages are sent in the following order:

Preamble,

Barker Code,

Reply Packet

Check Sum

After sending a command, the interrogator sends a continuous unmodulated RF signal with a frequency of 2.44; GHz. Return link data is Differential Phase Shift Key (DPSK) modulated onto a square wave subcarrier with a frequency of 596.1 KHz. A data 0 corresponds to one phase and data 1 corresponds to another, shifted 180 degrees from the first phase. The subcarrier is used to modulate antenna impedance of a transponder 16. For a simple dipole, a switch between the two halves of the dipole antenna is opened and closed. When the switch is closed, the antenna becomes the electrical equivalent of a single half-wavelength antenna that reflects a portion of the power being transmitted by the interrogator. When the switch is open, the antenna becomes the electrical equivalent of two quarter-wavelength antennas that reflect very little of the power transmitted by the interrogator. The switch driving a printed half wavelength dipole antenna gives a typical range of 15 feet when the interrogator 26 transmits at 30 dBm into a 6 dB gain antenna.

The preamble for the return link includes 2000 bits, alternating 2 zeros then 2 ones, etc., and a 13-bit start (Barker) code. Alternative preambles are possible.

In the illustrated embodiment, the start code or Barker Code is defined by the following bit string: 1111 1001 1010 1.

The reply link data is grouped in 13 bit words. Each word is composed of 8 data bits (D7, D6, DS, D4, D3, D2, D1, DO) and 5 ECC bits (P4, P3, P2, P1, P0).

The Block Encoded Sequence is D7, D6, D5, D4, D3, D2, D1, DO, P4, P3, P2, P1, P0.

The Block ECC Bits (P4-P0) are generated using the following equations:

P0=(D1+D2+D5+D7) modulo 2

P1=[(D1+D3+D4+D6) modulo 2] Complement

P2=(DO+D2+D3+D6+D7) modulo 2

P3=[(D0+D4+D5+D6+D7) modulo 2] Complement

P4=(DO+D1+D2+D3+D4+D5) modulo 2.

In the illustrated embodiment, the bit duration is 6.71 $\mu$s making the effective data rate 91.75 Kbps for the return link.

In the illustrated embodiment, a 16 bit check sum is provided to detect bit errors on the packet level. In one embodiment, a 16 bit CRC is employed in addition to or instead of the check sum.

Each pair of data words is interleaved, starting with the Barker code and the first data word. The transmitted bit order for two sequential words, A and B, is D7A, D7B, D6A, D6B, D5A, D5B, D4A, D4B, D3A, D3B, D2A, D2B, D1A, D1B, D0A, D0B, P4A, P4B, P3A, P3B, P2A, P2B, P1A, P1B, P0A, P0B.

D7A is the first transmitted bit. In the illustrated embodiment, DPSK is applied to the interleaved data.

Figure 5:
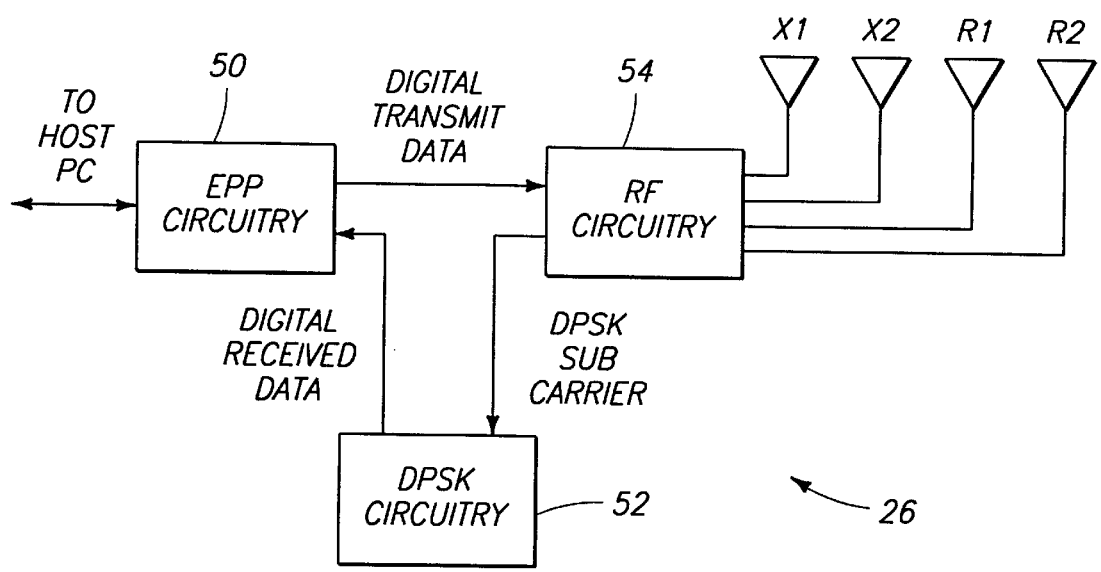
FIG. 5 is a block diagram of an interrogator in accordance with one embodiment of the invention.

In one embodiment (see FIG. 5), the interrogator 26 includes enhanced parallel port (EPP) circuitry 50, DPSK (differential phase shift keyed) circuitry 52, and RF (radio frequency) circuitry 54, as well as a power supply (not shown) and a housing or chassis (not shown). In the illustrated embodiment, the enhanced parallel port circuitry 50, the DPSK circuitry 52, and the RF circuitry 54 respectively define circuit card assemblies (CCAs). The interrogator uses an IEEE-1284 compatible port in EPP mode to communicate with the host computer 48. The EPP circuitry 50 provides all the digital logic required to coordinate sending and receiving a message with a transponder 16. The EPP circuitry 50 buffers data to transmit from the host computer 48, converts the data to serial data, and encodes it. The EPP circuitry 50 then waits for data from the transponder 16, converts it to parallel, and transfers it to the host computer 48. In one embodiment, messages include up to 64 bytes of data.

The EPP mode interface provides an a synchronous, interlocked, byte wide, bidirectional channel controlled by a host device. The EPP mode allows the host computer to transfer, at high speed, a data byte to/from the interrogator within a single host computer CPU I/O cycle (typically 0.5 microseconds per byte).

Figure 6:
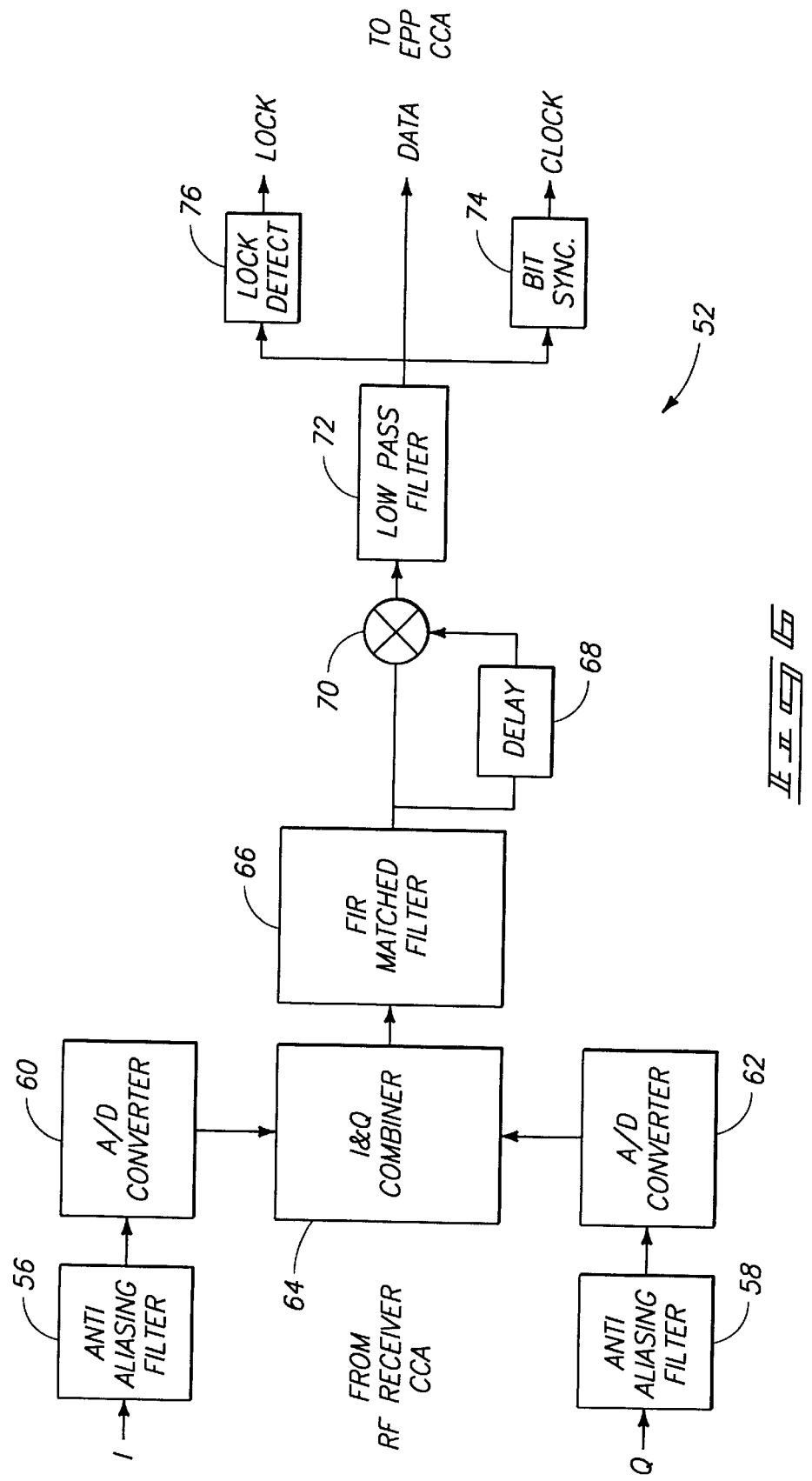
FIG. 6 is a circuit schematic of DPSK circuitry included in the interrogator of FIG. 5.

The DPSK circuitry 52 (see FIG. 6) receives signals I and Q from the RF circuitry 54 (described below), which signals contain the DPSK modulated sub-carrier. The DPSK circuitry 52 includes anti-aliasing filters 56 and 58 filtering the I and Q signals, respectively, and analog to digital (AID) converters 60 and 62 respectively coupled to the filters 56 and 58 and respectively converting the filtered signals from analog to digital signals. The DPSK circuitry 52 further includes a combiner 64, coupled to the AID converters 60 and 62, combining the digital signals. The DPSK circuitry 52 further includes a FIR matched filter 66, coupled to the combiner 64, which filters the combined signals. The DPSK circuitry 52 further includes delay circuitry 68 and multiplier circuitry 70 coupled to the FIR matched filter 66 for delaying the signal and multiplying the signal with the delayed signal to remove the sub-carrier. The DPSK circuitry 52 further includes low pass filter circuitry 72, coupled to the multiplier 70, filtering the output of the multiplier 70 to remove the X2 component. The DPSK circuitry 52 further includes a bit synchronizer 74 coupled to the filter 72 for regeneration of the data clock. The DPSK circuitry 52 further includes lock detect circuitry 76 coupled to the low pass filter 72 and generating a lock detect signal. The data, clock, and lock detect signal are sent to the EPP circuitry 50.

The RF circuitry 54 (see FIG. 7) interfaces with the transmit and receive antennas X1, X2, R1, and R2. The RF circuitry modulates the data for transmission to a transponder 16, provides a continuous wave (CW) carrier for backscatter communications with a transponder 16 (if backscatter communications are employed), and receives and downconverts the signal received from the transponder unit (which is a backscatter signal in one embodiment).

The RF circuitry 54 also includes a power divider 73, and a frequency synthesizer 75 coupled to the power divider 73. The frequency synthesizer 75 tunes the RF continuous waver carrier for frequency hopping and band selection. The RF circuitry defines a transmitter, and receives data from the EPP circuitry 50. The RF circuitry 54 includes an amplitude modulation (AM) switch 77 that receives the data from the EPP circuitry 50 and amplitude modulates the data onto a carrier. More particularly, the AM switch 77 turns the RF on and off (ON OFF KEY). The RF circuitry 54 further includes a power amplifier 79, coupled to the AM switch 77, which amplifies the signal. The RF circuitry 54 further includes a diversity switch 78, coupled to the power amplifier 79, for transmission of the amplified signal through a selected one of the two transmit antennas X1 and X2. In an alternative embodiment, the switch 78 is coupled to more than two antennas and provides for switching from among the multiple antennas.

During continuous wave (CW) transmission for the backscatter mode, the AM switch 77 is left in a closed position. When the interrogator 26 is transmitting in the CW mode, the transponder 16 backscatters the signal with a DPSK modulated sub-carrier. This signal is received via one of the two diversity receive antennas R1 and R2. More particularly, the RF circuitry 54 further includes a diversity switch 80 coupled to the receive antennas R1 and R2. In an alternative embodiment, the switch 80 is coupled to more than two receive antennas and provides for switching from among the multiple antennas. In another alternative embodiment, such as when backscatter communications are not employed, the RF circuitry uses common antennas for both transmission and reception, and selects from multiple available send/receive antennas. The RF circuitry 54 further includes a low noise amplifier (LNA) 82 coupled to the switch 80 and amplifying the received signal. The RF circuitry 54 further includes a quadrature downconverter 84, coupled to the LNA 82, coherently downconverting the received signal. The RF circuitry 54 further includes automatic gain controls (AGCS) 86 and 88 coupled to the quadrature down converter 84. The amplitude of the signals are set using the automatic gain controls 86 and 88 to provide the signals I and Q. The I and Q signals, which contain the DPSK modulated sub-carrier, are passed on to the DPSK circuitry 52 for demodulation.

FIG. 8 illustrates a stack or queue 90 including locations holding data representing antennas X1, X2, R1, and R2. In one embodiment, the stack or queue 90 is defined by memory, such as random access memory included in the host computer 48. The stack or queue 90 defines an order in which antennas will be used to attempt communication. More particularly, in the illustrated embodiment, the stack 90 has a plurality of rows defining the locations. In the illustrated embodiment, the stack has two columns, one holding data representing a transmit antenna X1 or X2, and another column holding data representing a receive antenna R1 or R2, and the various rows represent various possible combinations of transmit and receive antennas that can be employed to attempt communications with a transponder 16. In other embodiments, there are more than two send antennas and or receive antennas, so there will be more rows.

In one embodiment, where backscatter transmission is not employed, antennas are used for both transmitting and receiving, and the stack includes only one column. Note that, although multiple columns are illustrated to aid in understanding, only two data bits of a single data word are required to hold information corresponding to one of the illustrated rows. Also, rows and columns can be swapped, as will be readily apparent. For example, FIG. 8 could be illustrated as two rows of four columns each.

In the illustrated embodiment, the transmit antenna is preferably spaced apart from the transmit antenna X1. Also, in the illustrated embodiment, the receive antenna R2 is preferably spaced apart from the receive antenna R1. For example, in one embodiment, the transmit antenna X1 is spaced apart from the transmit antenna X2 by a distance of one wavelength or more. Wavelength is calculated as the speed of light divided by the communications frequency; i.e., approximately $3.0 \times 10^8$ meters/second divided by 2.44 GHz. In a more particular embodiment, the transmit antenna X1 is spaced apart from the transmit antenna X2 by a distance of between one wavelength and ten wavelengths. In one embodiment, the receive antenna R1 is spaced apart from the receive antenna R2 by a distance of one wavelength or more. In a more particular embodiment, the receive antenna R1 is spaced apart from the receive antenna R2 by a distance of between one wavelength and ten wavelengths. In one embodiment, the transmit antenna X2 is oriented at an angle different from the angle of the transmit antenna X1. In one embodiment, the receive antenna R2 is oriented at an angle different from the angle of the receive antenna R1. In one embodiment, the transmit antenna X2 is positioned at a height different from the height of the transmit antenna X1, relative to the ground. In one embodiment, the receive antenna R2 is positioned at a height different from the height of the receive antenna R1, relative to the ground.

When the interrogator attempts communication with a transponder 16, the interrogator will first attempt communications using the data at the top of the queue 90; i.e., in the embodiment shown in FIG. 8, the interrogator will first attempt to use an antenna pair represented by data in the first or top row of the stack 90 (e.g., using transmit antenna X1 and receive antenna R1 in the illustrated embodiment). If successful communication is not established, the interrogator 26 will attempt communication using the antenna pair represented by data in the second row of the stack 90 (e.g., using transmit antenna X1 and receive antenna receive antenna R2). If successful communication is still not established, the interrogator will attempt communication using the antenna pair represented by data in the third row of the stack 90 (e.g., using transmit antenna X2 and receive antenna receive antenna R1). If successful communication is not established, the interrogator will attempt communication using the antenna pair represented by data in the fourth row of the stack (e.g., using transmit antenna X2 and receive antenna receive antenna R2). If successful communication is still not established, the interrogator may again attempt communication using the antenna pair represented by data in the first row of the stack, or may terminate attempts at communication (either for a predetermined amount of time, or indefinitely). Any initial ordering of the stack can, of course, be employed. Preferably, all possible combinations of transmit and receive antennas will be included in the stack; however, in other embodiments, not all combinations of transmit and receive antennas will be included in the stack.

A problem with the method described in connection with FIG. 8 is that if one of the antennas (X1, for example) is blocked, broken, jammed, etc., the communication attempt may fail using multiple rows (e.g., the communication attempt will fail both Attempt 1 and Attempt 2 shown in FIG. 8 if X1 is blocked, etc.). Each attempt takes time. For example, in one embodiment, each attempt takes 20–40 milliseconds. Thus, in the illustrated embodiment, attempt 1 and attempt 2 fail, so 40–80 milliseconds are lost, even though a command will eventually be successfully sent from the interrogator to the transponder 16.

If the combination of send and receive antennas employed in the last successful attempt were tried first for a subsequent command, the chances (or probability) of receiving a good reply would be much higher. Therefore, a "last-good-on-top" selection can be made, using the host computer 48, in which the data representing the antenna pair for the last successful attempt is moved to the top of the stack; e.g., by a data arranger 92 included in the first transponder. Therefore, for the example described above, if successful communication does not take place until the antenna pair X2, R1 is employed, data representing the antenna pair X2, R1 is moved to the top of the stack 90 and the other pairs are pushed down as illustrated in FIG. 9. Therefore, for the next command, the antenna pair X2, R1 will be employed for the first communication attempt.

The data arranger re-orders the stack 90 as other hits occur (e.g., if the antenna pair represented by data in the top of the stack does not produce a successful communication but another antenna pair does produce a successful communication).

It is possible that more filtering would result in better ordering, particularly in a more dynamic scenario. For example, a failed communication may be due to a temporary condition (e.g., caused by a moving object proximate a transponder 16, by temporary interference, by temporary atmospheric conditions, etc.). Therefore, a "bubble-to-top" selection can be made, using the host computer 48, in which the data representing the antenna pair for the last successful attempt is moved up in the queue 90 by only one slot (or row, or location) by the data arranger 92. Therefore, for the example described above, if successful communication does not take place until the antenna pair X2, R1 is employed, data representing the antenna pair X2, R1 is swapped with data in the row above. Thus, data representing the antenna pair X2, R1 is moved up one row in the queue 90 and the data that was in that row is moved down one row. For the example described above in connection with FIG. 8, if successful communication does not take place until the antenna pair X2, R1 is employed, the resulting queue order will be that shown in FIG. 10. Therefore, for the next command, the antenna pair X1, R1 will still be employed for the first communication attempt.

Using the host computer 48, the data arranger 92 is selectively instructed to employ "bubble-to-top" (e.g., FIG. 10) data rearrangement of the queue 90, to employ "last-good-on-top" (e.g., FIG. 9) data rearrangement of the queue 90, or to perform no rearrangement of the queue 90 (e.g., FIG. 8). This selection can be made, in one embodiment, using two data bits in a command sent from the host computer 48 to the interrogator 26.

In one embodiment, no attempt is made to provide a separate stack or queue 90 for each transponder 16; however, in an alternative embodiment, a separate stack or queue 90 is maintained for each transponder 16.

Figure 11:
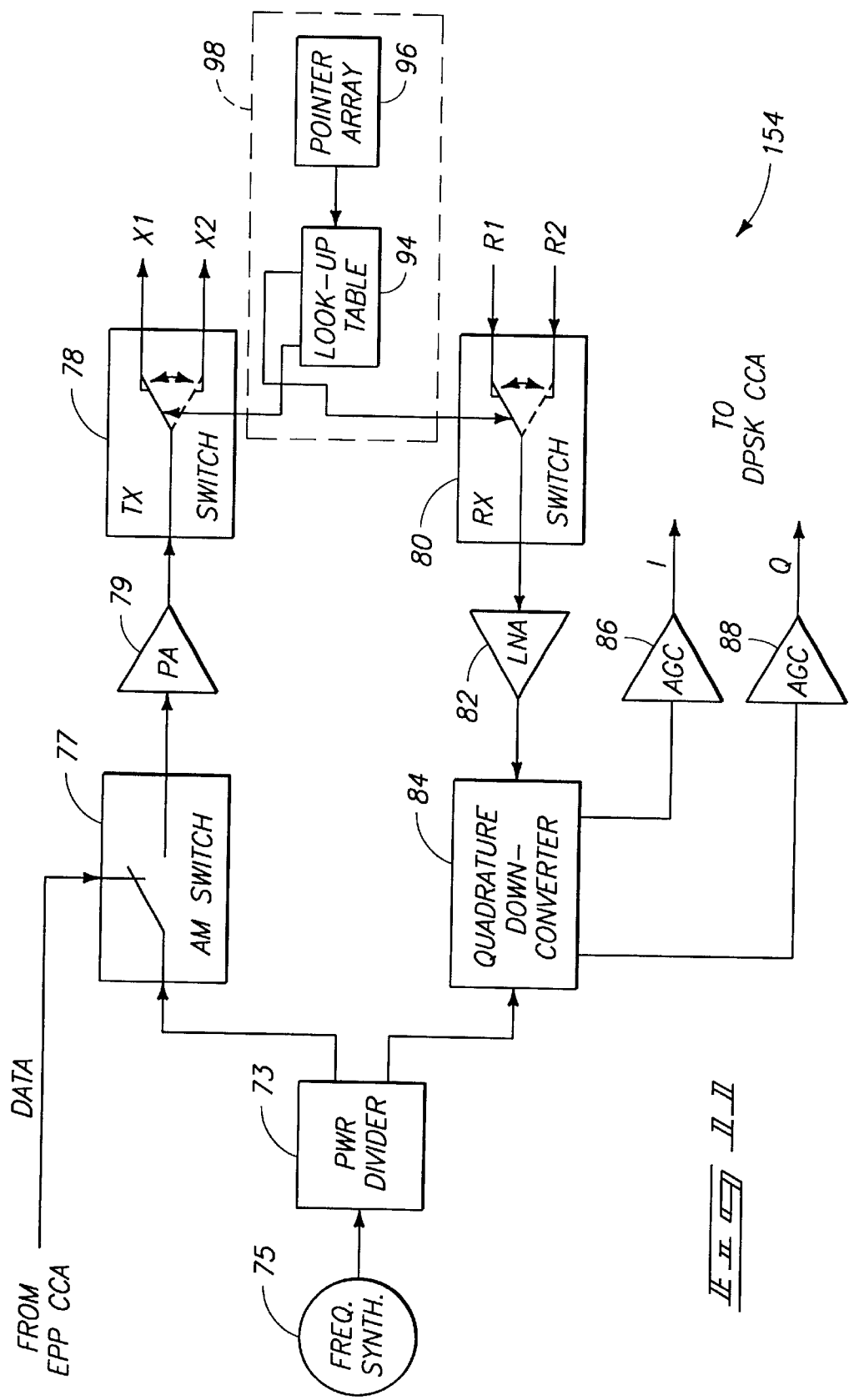
FIG. 11 is a circuit schematic of RF circuitry included in an interrogator in accordance with an alternative embodiment of the invention.

FIG. 11 is a circuit schematic of RF circuitry included in an interrogator in accordance with an alternative embodiment of the invention. FIG. 11 shows RF circuitry 154 that is similar to the RF circuitry 54 of FIG. 7, like reference numerals indicating like components, except that the RF circuitry 154 includes a look-up table 94 and pointer array 96 coupled to the TX diversity switch 78 and RX diversity switch 80. The look-up table 94 is defined in memory, such as in random access memory or read only memory. More particularly, in the illustrated embodiment, the host computer 48 includes random access memory 98 defining the look-up table 94 and the pointer array 96. Transmission of radio frequency signals occurs through a transmit antenna selected from a plurality of available antennas (e.g., X1, X2) depending on data stored in the look-up table 94 and the pointer array 96, as will be described below in greater detail. Similarly, reception of radio frequency signals occurs though a receive antenna selected from a plurality of available antennas (e.g., R1, R2) depending on data stored in the look-up table 94 and the pointer array 96. In alternative embodiments, the switch 78 of the RF circuitry 154 is coupled to more than two antennas and provides for switching from among the multiple antennas, and the switch 80 of the RF circuitry 154 is coupled to more than two antennas and provides for switching from among the multiple antennas.

Figure 12:
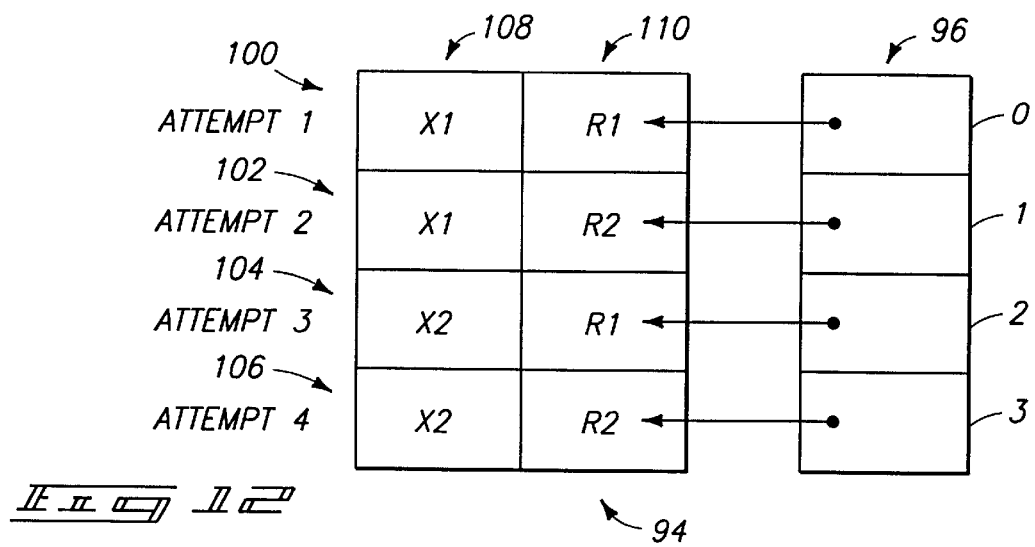
FIG. 12 illustrates pointers pointing to rows in a look-up table containing data representing an order of antennas to use in attempts to communicate from the interrogator of FIG. 11 to the transponder of FIG. 2 or 3.

FIG. 12 shows the pointer array 96 pointing to rows in the look-up table 94. The pointer array 96 is defined by a plurality of pointers or pointer array elements 0, 1, 2, and 3. In one embodiment, the pointers are separate pointers as opposed to elements of an array. The element 0 is the top element of the array 96, and the element 3 is the bottom element of the array 96. The array 96 defines an order, from the top of the array to the bottom of the array, in which antennas will be used by the interrogator 26 to attempt communication.

The table 94 includes locations holding data representing antennas X1, X2, R1, and R2. In the illustrated embodiment, the table 94 has a plurality of rows 100, 102, 104, and 106, and two columns 108 and 110. The column 108 holds data representing a transmit antenna X1 or X2, and the column 110 holds data representing a receive antenna R1 or R2, and the various rows 100, 102, 104, and 106 represent various possible combinations of transmit and receive antennas that can be employed to attempt communications with a transponder 16. In other embodiments, there are more than two send antennas and or receive antennas, so there will be more rows.

In one embodiment, where backscatter transmission is not employed, antennas are used for both transmitting and receiving, and the stack includes only one column. Note that, although multiple columns are illustrated to aid in understanding, only two data bits of a single data word are required to hold information corresponding to one of the illustrated rows. Also, rows and columns can be swapped, as will be readily apparent.

Figure 7:
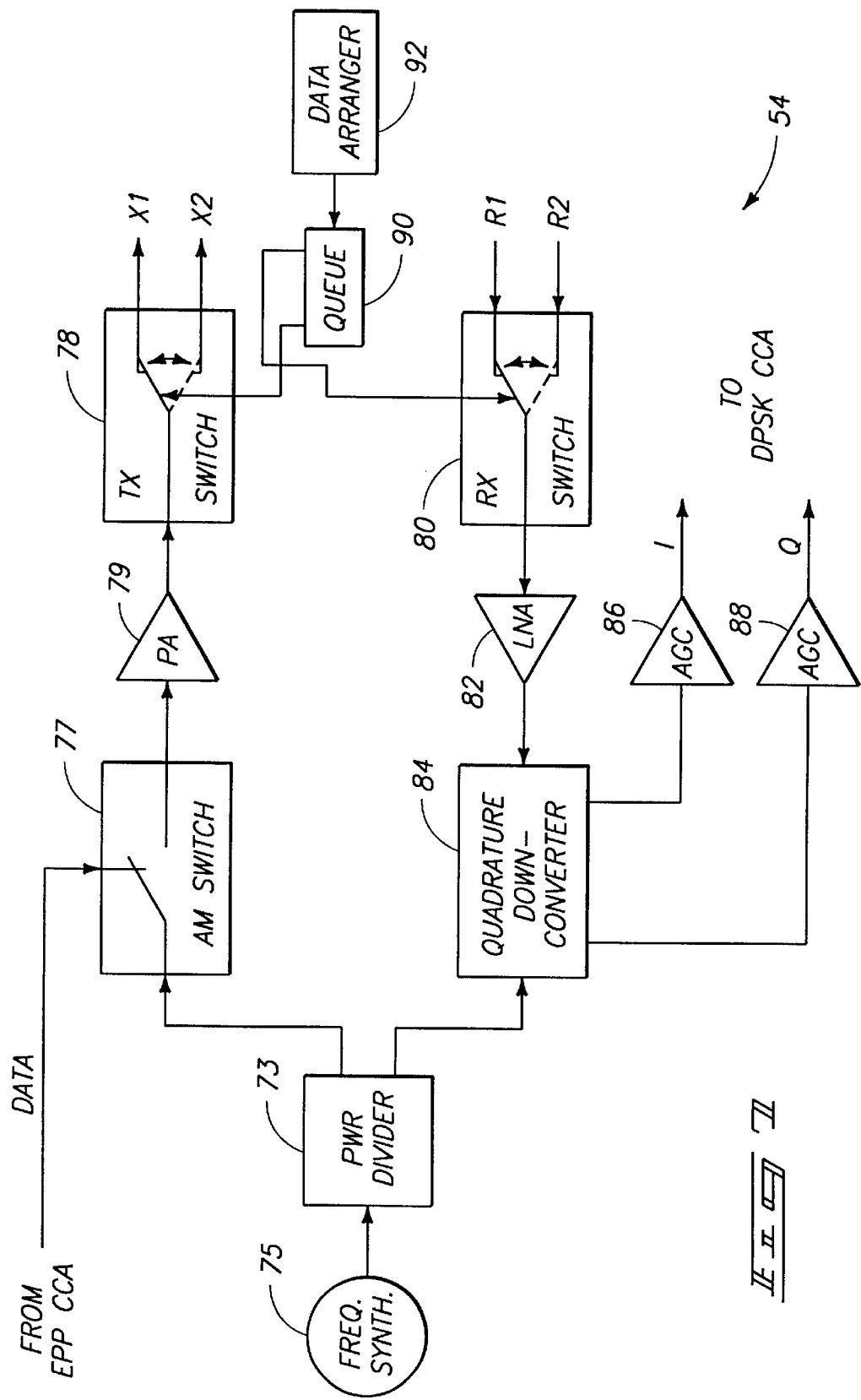
FIG. 7 is a circuit schematic of RF circuitry included in the interrogator of FIG. 5.

As described in connection with the embodiment of FIGS. 7 and 8, the transmit antenna X2 is preferably spaced apart from the transmit antenna X1, and, the receive antenna R2 is preferably spaced apart from the receive antenna R1 by previously described distances.

In the embodiment shown in FIGS. 11 and 12, when the interrogator 26 attempts communication with a transponder 16, the interrogator 26 will first attempt communications using an antenna pair represented by data in a row pointed to by the top or highest element 0 of the array 96. For example, in FIG. 12, the array element 0 points to the first or top row 100 of the table 94, so the switches 78 and 80 will switch to use transmit antenna X1 and receive antenna R1. If successful communication is not established, the interrogator 26 will attempt communication using the antenna pair represented by data in the row of the table 94 pointed to by the next highest element 1 of the array 96 (e.g., using transmit antenna X1 and receive antenna receive antenna R2). If successful communication is still not established, the interrogator will attempt communication using the antenna pair represented by data in the row of the table 94 pointed to by the next highest element 2 of the array 96 (e.g., using transmit antenna X2 and receive antenna receive antenna R1). If successful communication is not established, the interrogator will attempt communication using the antenna pair represented by data pointed to by the next highest element 3 in the array 96 (e.g., using transmit antenna X2 and receive antenna receive antenna R2). If successful communication is still not established, the interrogator may again attempt communication using the antenna pair represented by data in the row pointed to by the first pointer element 0, or may terminate attempts at communication (either for a predetermined amount of time, or indefinitely). Any initial ordering of the table 94 can, of course, be employed. Further, the pointers can initially point to any of the rows of the table 94; however, it is of course preferable that different pointers point to different rows. In the illustrated embodiment, the number of pointers (array elements) is equal to the number of rows of the table 94. Preferably, all possible combinations of transmit and receive antennas will be represented by data in the table 94; however, in other embodiments, not all combinations of transmit and receive antennas will be included.

Figure 13:
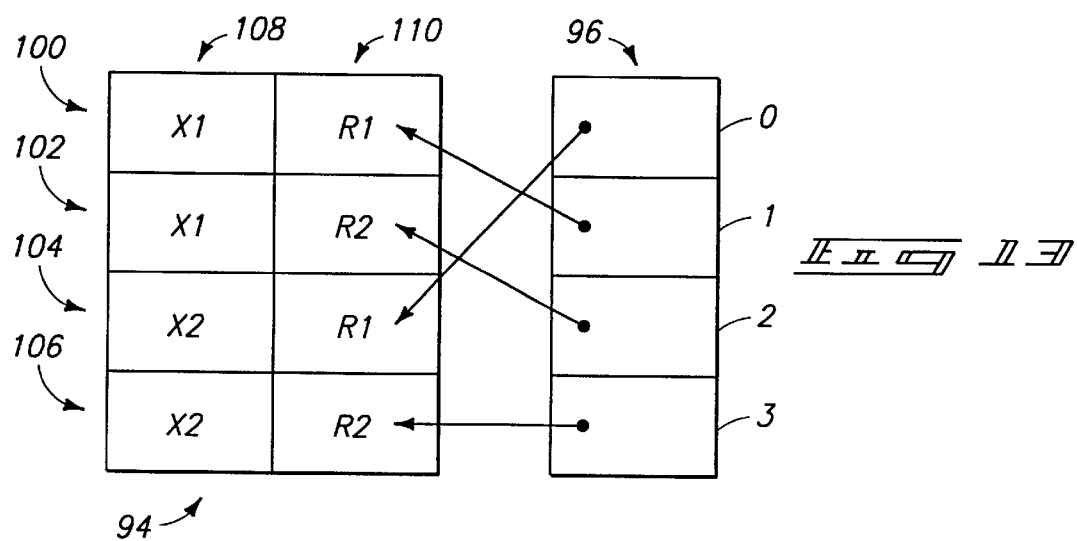
FIG. 13 illustrates the rows to which the pointers point being changed in accordance with one embodiment of the invention.

FIG. 13 illustrates using a "last-good-on-top" selection in the embodiments employing pointers. After a successful communication, data representing the antenna pair for the last successful attempt is pointed to by the top element 0 of the array 96 before the next command is sent. Therefore, for the example shown in FIG. 12, if successful communication does not take place until the antenna pair X2, R1 is employed, data representing the antenna pair X2, R1 is pointed to by the array element 0, and the other pairs are pointed to by lower array elements as illustrated in FIG. 13. Therefore, for the next command, the antenna pair X2, R1 will be employed for the first communication attempt. The pointer elements point to rows of the table by storing location data, such as memory addresses.

The location values stored in the pointer array 96 are re-arranged as other hits occur (e.g., if the antenna pair represented by data in the table pointed to by the top pointer 0 does not produce a successful communication but another antenna pair does produce a successful communication for a command).

Figure 14:
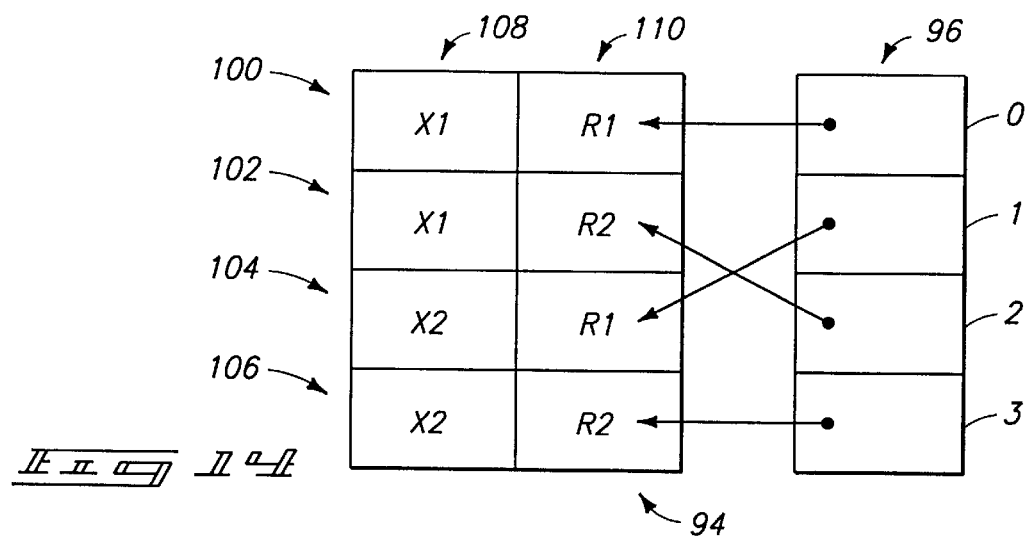
FIG. 14 illustrates the rows to which the pointers point being changed in accordance with another embodiment of the invention.

A "bubble-to-top" selection can also be made for the embodiment of FIGS. 11–12, using the host computer 48, in which the location value of data representing the antenna pair for the last successful attempt is moved up in the pointer array 96 by only one slot to the next higher array element. Therefore, for the example shown in FIG. 12, if successful communication does not take place until the antenna pair X2, R1 is employed, the location value in the third array element 2 is swapped with the location value in the next higher array element 1 as illustrated in FIG. 14. Thus, data representing the antenna pair X2, R1 is pointed to by the pointer I, and data representing the antenna pair X1, R2 is pointed to by the pointer 2. In one embodiment, a user can select the "best-on-top" mode of operation shown in FIG. 13, the "bubble-to-top" mode of FIG. 14, or a mode in which no rearrangement of the pointer array takes place after a successful communication.

In one embodiment, no attempt is made to provide a separate pointer array and table combination for each transponder 16; however, in an alternative embodiment, a pointer array and table is maintained for multiple transponders 16 with which the interrogator may communicate.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A radio frequency communications system comprising:
   a first radio frequency transponder adapted to be coupled to one of a plurality of selectable antennas, including a look-up table having rows holding data representing antennas, and including a pointer array having pointer elements pointing to different rows of the look-up table, the pointer array including a top row and a bottom row, the pointer array defining an order, from the top row of the array to the bottom row of the array, in which antennas will be used to attempt communication; and
   a second radio frequency transponder configured to communicate with the first transponder, wherein the first transponder uses an antenna defined by data in the row of the look-up table to which the element in the top row of the pointer array points, for communication with the second transponder, and, if successful communication with the second transponder is not established, the first transponder uses an antenna defined by data in the row of the look-up table to which the element in the second highest row in the array points, and, if successful communication with the second transponder is still not established, the first transponder uses an antenna defined by data in the row of the look-up table to which the element in the third highest row in the array points; wherein the order defined by the pointer array is selectively rearranged, the first radio frequency transponder being operable in a first mode, wherein the order defined by the pointers is rearranged after a successful communication with the second radio frequency transponder such that the top row of the array points to data representing the first row in the look-up table that resulted in successful communication, and a second mode, wherein the order defined by the pointers is rearranged after a successful communication with the second radio frequency transponder such that the element of the array which pointed to the row in the look-up table that resulted in successful communication points to the next higher row in the look-up table and such that the next higher element of the array points to the row in the look-up table that resulted in successful communication.

2. A radio frequency communications system in accordance with claim 1 wherein the first radio frequency transponder is further operable in a third mode wherein the order defined by the pointers is not rearranged regardless of which row in the look-up table resulted in successful communication with the second transponder.

3. A radio frequency communications system in accordance with claim 1 wherein the first transponder communicates with the second transponder using backscatter communications and, after the first transponder sends data to the second transponder, the first transponder transmits a continuous wave to the second transponder, wherein the communication system includes a dipole antenna coupled to the second transponder, the dipole antenna having two halves, and wherein the second transponder selectively reflects and does not reflect the continuous wave by either shorting or not shorting the two halves of the dipole antenna.

4. A radio frequency communications system in accordance with claim 1 wherein the first transponder communicates with the second transponder using backscatter communications, wherein the first transponder employs separate receive and transmit antennas, and wherein the respective rows of the look-up table store data representing antenna pairs respectively defined by one transmit antenna and one receive antenna.

5. A radio frequency communications system in accordance with claim 1 wherein the second transponder comprises a radio frequency identification device including memory storing data identifying the second transponder.

6. A radio frequency communications system wireless communications system in accordance with claim 1 and further comprising a plurality of transmit antennas, wherein the first transponder includes a switch for selecting which of the transmit antennas will be employed for wireless transmission by the first transponder, and wherein one of the transmit antennas is spaced apart from another of the transmit antennas by at least one wavelength.

7. A radio frequency communications method comprising:
   defining a table having rows holding data representing antennas, and defining an array of pointer elements respectively storing location values pointing to different rows of the table, the array including a top and a bottom, the array defining an order, from the top of the array to the bottom of the array, in which antennas will be used to attempt communication;
   causing a first transponder to use an antenna defined by data in the table in a row pointed to by the pointer element at the top of the array for communication with a second transponder, and, if successful communication with the second transponder is not established, causing the first transponder to use an antenna defined by data in a row pointed to by the next highest pointer element of the array; and rearranging the order in accordance with a selected one of a first mode, wherein the location value pointing to data representing the first antenna that resulted in successful communication is moved to the top element of the array, and a second mode, wherein the location value pointing to data representing the first antenna that resulted in successful communication is swapped with the location value in the next higher element in the array.

8. A radio frequency communications method in accordance with claim 7 wherein the rearranging step further includes a selectable third mode, wherein the location values are not rearranged regardless of which antenna selection results in successful communication with the second transponder.

9. A radio frequency communications method in accordance with claim 7 and further comprising the step of causing the first transponder to communicate with the second transponder using backscatter communications and, after the first transponder sends data to the second transponder, causing the first transponder to transmit a continuous wave to the second transponder, and causing the second transponder to communicate with the first transponder by selectively reflecting and not reflecting the continuous wave by either shorting or not shorting two halves of a dipole antenna.

10. A radio frequency communications method in accordance with claim 7 and further comprising causing the first transponder to communicate with the second transponder using backscatter communications, and coupling the first transponder to separate receive and transmit antennas, and storing data in the respective rows of table representing antenna pairs respectively including one transmit antenna and one receive antenna.

11. A radio frequency communications method in accordance with claim 7 and further comprising the step of storing identifying data in the second transponder, and causing the second transponder to communicate the identifying data to the first transponder in response to a command from the first transponder.

12. A backscatter radio frequency communications system comprising:

a plurality of transmit antennas and receive antennas;

a first radio frequency transponder selectively coupled to an antenna pair defined by one of the transmit antennas and one of the receive antennas, including a table having rows holding data representing antenna pairs, and including an array of pointers defined by array elements respectively storing location values pointing to different rows of the table, the array having a top element, a bottom element, and intermediate elements, the array defining an order, from the top of the array to the bottom of the array, in which antennas will be used by the first transponder to attempt communication;

a second radio frequency transponder configured to communicate with the first transponder, wherein the first transponder uses an antenna pair defined by data in a row of the table pointed to by the location value stored in the top element of the array for communication with the second transponder, and, if successful communication with the second transponder is not established, the transponder uses an antenna pair defined by data pointed to by the location value stored in the next highest element of the array, the first transponder being configured to communicate with the second transponder using backscatter communications wherein, after the first transponder sends data to the second transponder, the first transponder transmits a continuous wave to the second transponder;

a dipole antenna coupled to the second transponder, the dipole antenna having two halves, the second transponder being configured to reflect and not reflect the continuous wave by either shorting or not shorting the two halves of the dipole antenna to communicate with the first transponder; and wherein the order of the location values in the array is selectively reordered, and the first transponder is operable in a first mode, wherein the location value pointing to data representing the first antenna pair that resulted in successful communication is moved to the top of the array, a second mode, wherein the location value pointing to data representing the first antenna pair that resulted in successful communication is swapped with the location value in the next higher element in the array, and a third mode wherein the location values stored in the array are not rearranged regardless of which antenna selection results in successful communication with the second transponder.

* * * * *

UNITED STATES PATENT AND TRADEMARK OFFICE
CERTIFICATE OF CORRECTION

PATENT NO. : 6,289,209 B1
DATED : September 11, 2001
INVENTOR(S) : Clifton W. Wood, Jr.

It is certified that error appears in the above-identified patent and that said Letters Patent is hereby corrected as shown below:

Column 4,
Line 41, replace "to defame" with -- to define --.

Column 9,
Line 63, replace ".of the form" with -- of the form --.

Column 10,
Line 43, replace "P4 32 (D0+D1" with -- P4 (D0+D1 --.

Column 12,
Line 11, replace "(AID)" with -- (A/D) --.
Line 15, replace "AID" with -- A/D --.

Column 13,
Line 40, replace "antenna is" with -- antenna X2 is --.

Signed and Sealed this

Twenty-sixth Day of March, 2002

Attest:

Attesting Officer

JAMES E. ROGAN
Director of the United States Patent and Trademark Office